(12) United States Patent
Shin et al.

(10) Patent No.: US 9,652,128 B2
(45) Date of Patent: May 16, 2017

(54) METHOD AND APPARATUS FOR CONTROLLING ELECTRONIC DEVICE

(71) Applicant: ELECTRONICS AND TELECOMMUNICATIONS RESEARCH INSTITUTE, Daejeon-si (KR)

(72) Inventors: Hong Chang Shin, Daejeon-si (KR); Gi Mun Um, Daejeon-si (KR); Chan Kim, Daejeon-si (KR); Hyun Lee, Daejeon-si (KR); Eung Don Lee, Daejeon-si (KR); Won Sik Cheong, Daejeon-si (KR); Nam Ho Hur, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 163 days.

(21) Appl. No.: 14/134,387

(22) Filed: Dec. 19, 2013

(65) Prior Publication Data

US 2014/0223349 A1    Aug. 7, 2014

(30) Foreign Application Priority Data

Feb. 5, 2013  (KR) .................. 10-2013-0012732

(51) Int. Cl.
*G06F 3/048* (2013.01)
*G06F 3/0484* (2013.01)
*G06F 17/30* (2006.01)
*G06T 19/00* (2011.01)
*G06T 7/73* (2017.01)

(52) U.S. Cl.
CPC ...... *G06F 3/0484* (2013.01); *G06F 17/30879* (2013.01); *G06T 7/73* (2017.01); *G06T 19/006* (2013.01)

(58) Field of Classification Search
CPC ........................... G06F 1/1639; H04L 12/282
See application file for complete search history.

(56) References Cited

U.S. PATENT DOCUMENTS

| | | | | |
|---|---|---|---|---|
| 2011/0197147 A1* | 8/2011 | Fai | ......... | G06F 1/1639 715/753 |
| 2012/0009914 A1* | 1/2012 | Lee | ......... | H04L 12/282 455/420 |

FOREIGN PATENT DOCUMENTS

| | | |
|---|---|---|
| JP | 2008-147768 A | 6/2008 |
| KR | 1020120005324 A | 1/2012 |
| KR | 1020120083159 A | 7/2012 |

* cited by examiner

*Primary Examiner* — Jeffrey A Gaffin
*Assistant Examiner* — Ayesha Huertas Torres
(74) *Attorney, Agent, or Firm* — Ladas & Parry LLP

(57) ABSTRACT

There are provided a method and apparatus for controlling an electronic device. The apparatus for controlling an electronic device includes a marker recognition unit configured to recognize the marker of the electronic device and a control unit configured to perform communication with the electronic device based on the marker and control the electronic device using a Graphic User Interface (GUI) program received from the electronic device.

7 Claims, 4 Drawing Sheets

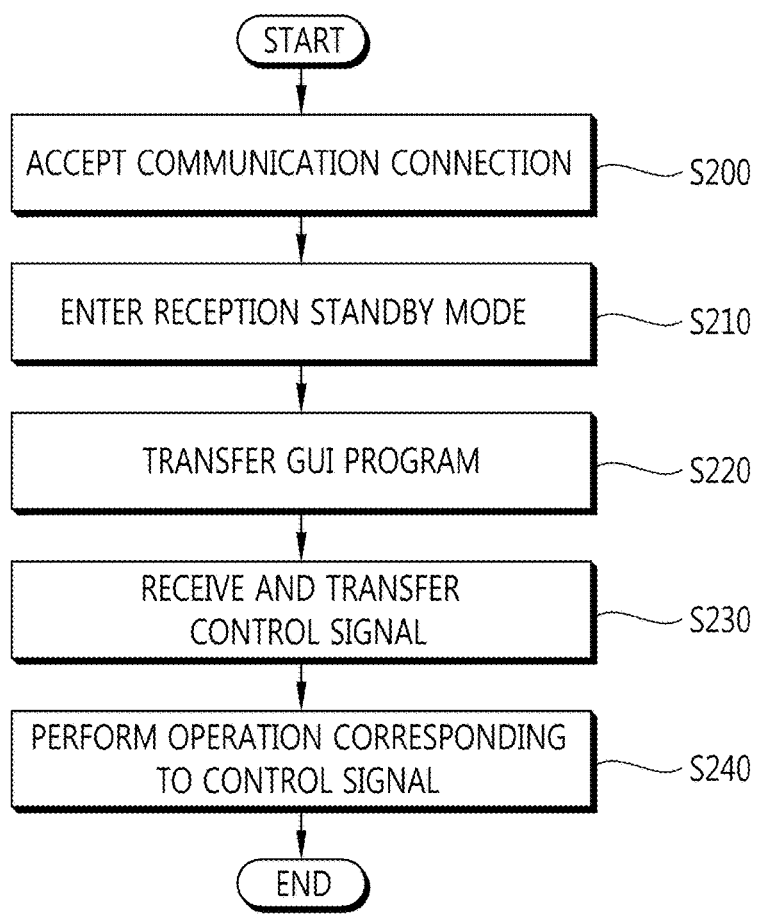

METHOD AND APPARATUS FOR CONTROLLING ELECTRONIC DEVICE

Priority to Korean patent application number 2013-0012732 filed on Feb. 5, 2013, the entire disclosure of which is incorporated by reference herein, is claimed.

BACKGROUND OF THE INVENTION

Field of the Invention

The present invention relates to a method and apparatus for controlling an electronic device and, more particularly, to a method and apparatus for controlling an electronic device using a mobile terminal equipped with a camera and a touch screen.

Discussion of the Related Art

Recently, electronic devices having various functions are being increasingly used. The electronic devices are basically faithful to the functions, and an aesthetic point of view of the products is being taken into consideration.

The functions of the electronic devices are diversified, whereas the designs of the electronic device become very intuitive and simple. That is, since most users do not want to learn electronic devices as if they read instructions, the user interfaces of the electronic devices become very intuitive and simple although the electronic devices have many function.

As described above, when purchasing an electronic device, most users tend to be familiar with the functions of the electronic device while directly driving the electronic device as a model, but do not carefully read instructions from the start to the end in order to be familiar with the functions. In other words, most users become familiar with the functions of the electronic device by intuitively driving the electronic device or imitating the others.

As described above, it will be very convenient for a user if the user can immediately know a method of driving an electronic device when manipulating the electronic device. As described above, a user wants an electronic device having various functions and also wants a product having an intuitive interface that enables easy manipulations. Accordingly, there is a need for technology in which an electronic device can be intuitively controlled.

PRIOR ART DOCUMENT

Patent Document (Patent Document 1) Korean Patent Laid-Open Publication No. 10-2012-0083159 entitled 'MOBILE TERMINAL AND METHOD FOR CONTROLLING ELECTRONIC DEVICES OF THE SAME' (by LG Electronics, Jul. 25, 2012)

SUMMARY OF THE INVENTION

An object of the present invention is to intuitively control an electronic device using a mobile terminal equipped with a camera and a touch screen.

Technical objects to be achieved by the present invention are not limited to the aforementioned object, and other technical objects that have not been described above will become evident to those skilled in the art from the following description.

In an aspect of the present invention, an apparatus for controlling an electronic device includes a marker recognition unit configured to recognize the marker of the electronic device and a control unit configured to perform communication with the electronic device based on the marker and control the electronic device using a Graphic User Interface (GUI) program received from the electronic device.

The apparatus may further include a camera configured to photograph the marker of the electronic device and provide a real image of the electronic device.

The marker recognition unit may generate marker pose information by calculating a pose of the marker including a position and angle.

The control unit may provide an Augmented Reality (AR) manipulation GUI in which an AR graphic is displayed on the real image according to the position and angle of the electronic device based on the GUI program and the marker pose information.

The apparatus may further include a control image output unit configured to receive an AR manipulation GUI generated based on the GUI program from the control unit and provide a user with an AR manipulation screen generated by the AR manipulation GUI, an input and output unit configured to display the AR manipulation screen and transfer a control signal generated when the AR manipulation screen is touched, and a control command reception unit configured to transfer the control signal, received from the input and output unit, to the control unit so that the control signal is transferred to the electronic device.

In another aspect of the present invention, a method of controlling an electronic device includes recognizing the marker of the electronic device, starting communication with the electronic device based on the marker, receiving a GUI program from the electronic device, and controlling the electronic device using the GUI program.

The method may further include photographing a real image of the electronic device.

Recognizing the marker may include generating marker pose information by calculating a pose of the marker including a position and angle.

Controlling the electronic device may include providing an AR manipulation GUI in which an AR graphic is displayed on the real image according to the position and angle of the electronic device based on the GUI program and the marker pose information.

Controlling the electronic device may further include displaying an AR manipulation screen, generated by the AR manipulation GUI, to a user.

Controlling the electronic device may further include receiving a control signal generated when the AR manipulation screen is touched.

In yet another aspect of the present invention, an apparatus for controlling an electronic device includes a camera configured to photograph the marker of the electronic device and provide a real image of the electronic device, a marker recognition unit configured to analyze the marker and provide marker analysis information based on the analyzed marker for communication with the electronic device, and a control unit configured to perform communication with the electronic device based on the marker analysis information and provide an AR manipulation GUI for manipulating the electronic device using a GUI program received from the electronic device.

The marker recognition unit may generate marker pose information by calculating a pose of the marker including a position and angle.

The control unit may provide the AR manipulation GUI in which an AR graphic is displayed on the real image according to the position and angle of the electronic device based on the GUI program and the marker pose information.

The apparatus may further include a control image output unit configured to provide a user with an AR manipulation screen generated by the AR manipulation GUI.

The apparatus may further include an input and output unit configured to display the AR manipulation screen and transfer a control signal generated when the AR manipulation screen is touched.

The apparatus may further include a control command reception unit configured to transfer the control signal, received from the input and output unit, to the control unit.

In yet further another aspect of the present invention, a method of controlling an electronic device includes photographing the marker of the electronic device, starting communication with the electronic device based on marker analysis information obtained by analyzing the marker, receiving a GUI program from the electronic device, and providing an AR manipulation GUI for manipulating the electronic device using the GUI program.

BRIEF DESCRIPTION OF THE DRAWINGS

FIG. 4 is a flowchart illustrating the operation of an electronic device according to control of a mobile terminal in accordance with an embodiment of the present invention.

DETAILED DESCRIPTION OF THE EMBODIMENTS

Figure 1:
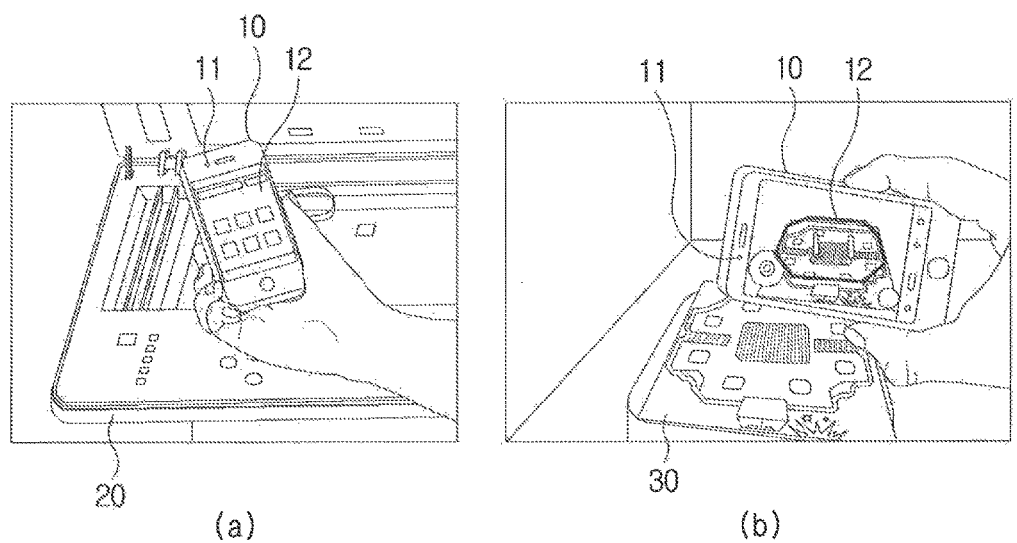
FIG. 1 is a diagram showing an example (a) and an example (b) in which an electronic device is controlled using a mobile terminal in accordance with an embodiment of the present invention.

The present invention may be modified in various ways and may be implemented to have several embodiments. Specific embodiments of the embodiments are illustrated in the drawings and are described in detail.

It is however to be noted that the present invention is not intended to be limited to the specific embodiments, but is intended to include all modifications, equivalents, or substitutions which fall within the spirit and technical scope of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term, such as and/or, includes a combination of a plurality of pertinent and described items or any one of a plurality of pertinent and described items.

When it is said that one element is 'connected' or 'coupled' with the other element, it should be understood that one element may be directly connected or coupled with the other element, but a third element may exist between the two elements. In contrast, when it is said that one element is 'directly connected' or 'directly coupled' with the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as 'comprise' or 'have', are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All the terms used herein, unless otherwise defined, have the same meanings which are typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, some embodiments of the present invention will be described in detail with reference to the accompanying drawings. In describing the present invention, in order to help general understanding, the same reference numerals designate the same elements throughout the drawings, and a redundant description of the same elements is omitted.

FIG. 1 is a diagram showing an example in which an electronic device is controlled using a mobile terminal in accordance with an embodiment of the present invention.

As shown in FIG. 1, in an embodiment of the present invention, an electronic device 20 is controlled by using a mobile terminal 10 having camera and touch screen functions. The mobile terminal 10 can be equipped with a camera 11 and a touch screen unit 12 and can be a smart phone or Personal Digital Assistants (PDA).

The mobile terminal 10 needs to have the following functions in order to control the electronic device 20 as described above. First, the mobile terminal 10 needs to identify the electronic device 20 to be controlled. Furthermore, the mobile terminal 10 needs to transmit and receive control commands through communication with the electronic device 20. Furthermore, the mobile terminal 20 needs to display a manipulation interface that can be directly checked by a user.

An example in which the electronic device 20 is controlled using the mobile terminal 10 is described in brief below.

First, the mobile terminal 10 photographs the electronic device 20 to be controlled using the camera 11 and recognizes the photographed electronic device 20. In an embodiment of the present invention, it is assumed that a marker (hereinafter also called a 'sign'), such as a Quick Response Code (QR) code or an Augmented Reality (hereinafter referred to as an 'AR') marker including information about the electronic device, is attached to the electronic device 20 so that the mobile terminal 10 can easily recognize the electronic device 20. That is, the mobile terminal 10 photographs the sign attached to the electronic device 20 using the camera 11.

The mobile terminal 10 receives ID information about the electronic device 20 and communication information for communication with the electronic device 20 through the photographed sign. The mobile terminal 10 receives a Graphic-based User Interface program (hereinafter referred to as a 'GUI program') for manipulating the electronic device 20 over a LAN communication network or a wireless Internet network based on the communication information. The mobile terminal 10 controls the electronic device 20 using the received GUI program.

The LAN communication network can include Bluetooth, Radio Frequency IDentification (RFID), infrared data association, Ultra WideBand (UWB), and ZigBee. The wireless Internet network can include a Wireless LAN (WLAN), Wi-Fi, a wireless broadband, Worldwide Interoperability for Microwave Access (WiMAX), and High Speed Downlink Packet Access (HSDPA).

In an example (a) in which the electronic device is controlled using the above method, the mobile terminal 10 recognizes a QR code and controls the electronic device 20. In an example (b) in which the electronic device 20 is controlled using the above method, the mobile terminal 10 recognizes an AR marker indicated in a plane 30, receives information and a pose (angle and position) for the background, and provides AR service by overlaying a graphic image with a real image background photographed by the camera 11. In other words, the mobile terminal 10 receives a GUI program by directly communicating with the electronic device 20 based on information obtained by photographing a sign, such as a QR code or an AR marker attached to the electronic device 20, using the camera 11 and displays an AR GUI through which graphics are overlapped with a real image captured by the camera 11 using the GUI program, thereby being capable of a more intuitive interface.

Figure 2:
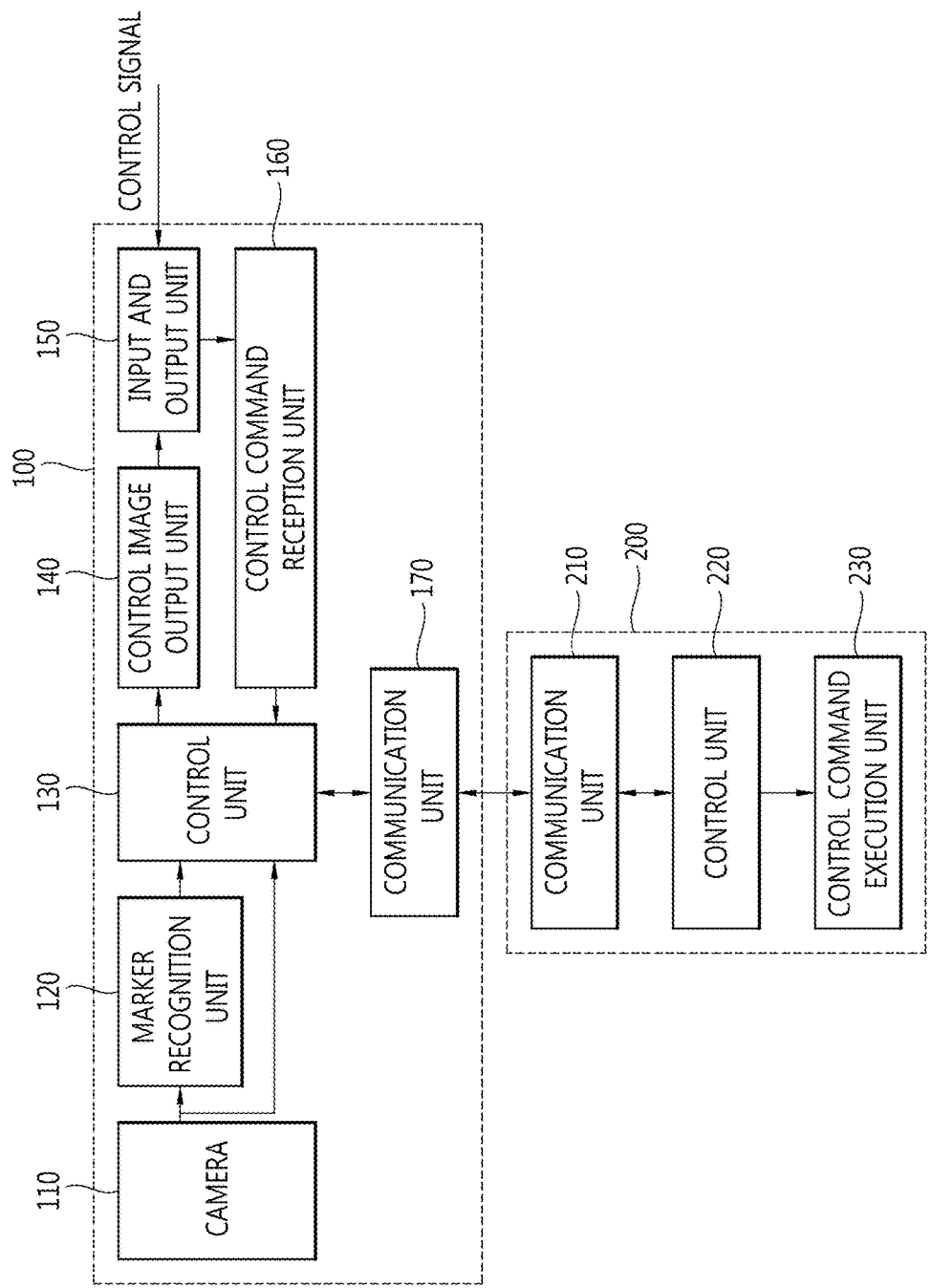
FIG. 2 is a block diagram schematically showing an apparatus for controlling an electronic device in accordance with an embodiment of the present invention.

FIG. 2 is a block diagram schematically showing an apparatus for controlling an electronic device in accordance with an embodiment of the present invention.

As shown in FIG. 2, the electronic device control apparatus 100 in accordance with an embodiment of the present invention is included in a mobile terminal equipped with camera and touch screen functions. The electronic device control apparatus 100 includes a camera 110, a marker recognition unit 120, a control unit 130, a control image output unit 140, an input and output unit 150, a control command reception unit 160, and a communication unit 170.

The camera 110 photographs a marker attached to an electronic device 200. Furthermore, the camera 110 transfers a real image of the electronic device 200 to the control unit 130.

The marker recognition unit 120 receives an image of the marker of the electronic device 200 that has been captured by the camera 110. The marker recognition unit 120 transfers marker analysis information, obtained by analyzing the photographed marker, to the control unit 130. The marker analysis information includes ID information and communication information for communication on which a mobile terminal recognizes the electronic device 200 and automatically performs communication with the electronic device 200. The marker recognition unit 120 calculates a pose (position and angle) of the marker simultaneously with the recognition of the marker, generates marker pose information based on the calculated pose, and transfers the generated marker pose information to the control unit 130.

The control unit 130 receives the marker analysis information and the marker pose information from the marker recognition unit 120. The control unit 130 also receives the real image of the electronic device 200 captured by the camera 110. The control unit 130 prepares communication with the electronic device 200 through the communication unit 170 based on the marker analysis information. When communication with the electronic device 200 is accepted, the control unit 130 receives a GUI program necessary to control the electronic device 200 from the electronic device 200. In an embodiment of the present invention, an operation method of controlling the electronic device 200 based on a GUI program can be represented in graphics through an AR.

The control unit 130 generates an AR manipulation GUI by displaying an AR graphic on the real image using the GUI program. In other words, the control unit 130 generates the AR manipulation GUI by overlaying real image with the AR graphic according to the position and angle of the electronic device 200 based on the marker pose information. Furthermore, the control unit 130 transfers the AR manipulation GUI to the control image output unit 140 so that a user can intuitively manipulate the electronic device 200. When a user inputs a control signal by touching a screen displayed in the AR manipulation GUI (hereinafter referred to as an 'AR manipulation screen'), the control unit 130 checks whether or not the inputted control signal is a valid control signal and transfers the inputted control signal to the electronic device 200 through the communication unit 170.

The control image output unit 140 receives the AR manipulation GUI from the control unit 130. The control image output unit 140 provides a user with the AR manipulation screen, generated by the AR manipulation GUI, through the input and output unit 150.

The input and output unit 150 is a touch screen in which sensors for sensing a touch operation have a mutual-layered structure, and the input and output unit 150 also operates as both an output device and an input device. In other words, the input and output unit 150 displays the AR manipulation screen and transfers a control signal, received when the AR manipulation screen is touched, to the control command reception unit 160.

The control command reception unit 160 receives the control signal, received when a user touches the AR manipulation screen from the input and output unit 150. The control command reception unit 160 transfers the control signal to the control unit 130 so that the control signal can be transferred to the electronic device 200.

In response to an instruction from the control unit 130, the communication unit 170 transmits and receives all pieces of information necessary to intuitively manipulate the electronic device 200 by directly performing communication with the electronic device 200.

The electronic device 200 includes a communication unit 210, a control unit 220, and a control command execution unit 230.

The communication unit 210 accepts connection when the electronic device control apparatus 100 requests communication from the electronic device 200. Furthermore, the communication unit 210 informs the control unit 220 that the electronic device control apparatus 100 has requested connection.

When connection with the electronic device control apparatus 100 is accepted, the control unit 220 enters a reception standby mode in which a control signal is received. Furthermore, the control unit 220 transfers the GUI program necessary to control the electronic device 200 to the electronic device control apparatus 100 through the communication unit 210 along with a message that informs that communication has been prepared. Meanwhile, when a user inputs a control signal to the electronic device control apparatus 100 by touching the AR manipulation screen, the control unit 220 receives the control signal from the electronic device control apparatus 100. The control unit 220 transfers the control signal to the control command execution unit 230 so that the electronic device 200 can execute an operation corresponding to the control signal.

The control command execution unit 230 receives the control signal from the control unit 220. The control command execution unit 230 checks a function corresponding to the control signal so that the electronic device 200 performs the corresponding operation.

Figure 3:
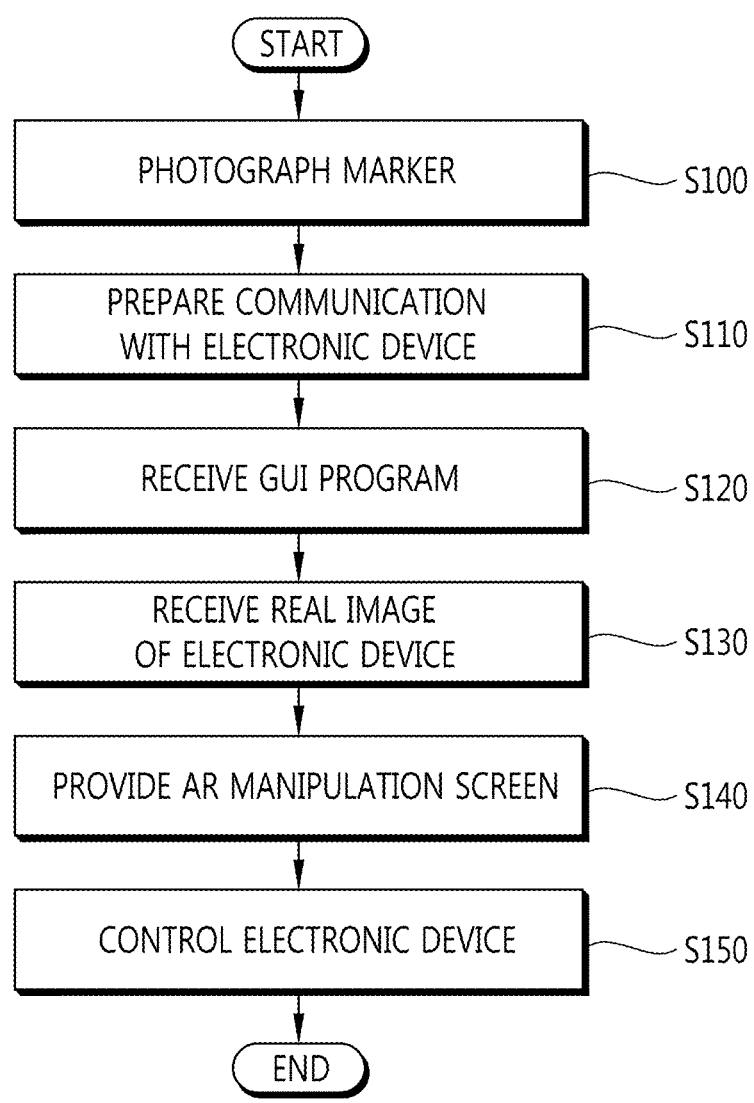
FIG. 3 is a flowchart illustrating a method of remotely controlling an electronic device in accordance with an embodiment of the present invention.

FIG. 3 is a flowchart illustrating a method of remotely controlling an electronic device in accordance with an embodiment of the present invention.

Referring to FIGS. 2 and 3, the electronic device control apparatus 100 in accordance with an embodiment of the present invention photographs a marker attached to the electronic device 200 using the camera 110 and transfers the photographed marker to the marker recognition unit 120 at step S100. The marker recognition unit 120 transfers marker analysis information and marker pose information, obtained by analyzing the photographed marker, to the control unit 130.

The control unit 130 prepares communication with the electronic device 200 based on the marker analysis information at step S110. When communication with the electronic device 200 is accepted, the control unit 130 receives a GUI program necessary to control the electronic device 200 from the electronic device 200 at step S120. The control unit 130 receives a real image of the electronic device 200 captured by the camera 110 at step S130.

The control unit 130 transfers an AR manipulation GUI, generated by overlaying the real image with an AR graphic according to the position and angle of the electronic device 200 using the GUI program, to the control image output unit 140. The control image output unit 140 provides a user with an AR manipulation screen generated by the AR manipulation GUI through the input and output unit 150 at step S140.

When the user inputs a control signal by touching a screen displaying the AR manipulation screen, the control unit 130 checks whether or not the inputted control signal is a valid control signal and transfers the inputted control signal to the electronic device 200 so that the electronic device 200 executes an operation corresponding to the inputted control signal at step S150.

FIG. 4 is a flowchart illustrating the operation of an electronic device according to control of a mobile terminal in accordance with an embodiment of the present invention.

Referring to FIGS. 2 and 4, the communication unit 210 of the electronic device 200 in accordance with an embodiment of the present invention accepts connection when the electronic device control apparatus 100 requests communication from the electronic device 200 at step S200.

The control unit 220 enters a reception standby mode in which a control signal is received at step S210. The control unit 220 transfers a GUI program necessary to control the electronic device 200 to the electronic device control apparatus 100 at step S220.

Meanwhile, when a user inputs a control signal to the electronic device control apparatus 100 through an AR manipulation screen, the control unit 220 receives the control signal from the electronic device control apparatus 100 at step S230. The control unit 220 transfers the control signal to the control command execution unit 230 so that the electronic device 200 can execute an operation corresponding to the control signal.

The control command execution unit 230 checks a function corresponding to the control signal so that the electronic device 200 executes the corresponding operation at step S240.

The electronic device control apparatus 100 in accordance with an embodiment of the present invention has been illustrated as controlling the electronic device 200 that is being powered on and operating, but the present invention is not limited thereto. For example, the electronic device control apparatus 100 may control the electronic device 200 after turning on the electronic device 200. A technique for remotely turning on the electronic device 200 is not a major characteristic of the present invention, and thus a detailed description thereof is omitted.

In accordance with the method and apparatus for controlling an electronic device, as 'Shoot & Control' service is provided through a mobile terminal, a user can control an electronic device at a remote place using an intuitive interface when using the electronic device. In other words, a mobile terminal can automatically perform communication with an electronic device by recognizing a marker attached to the electronic device without checking a product name or product number of the electronic device or a communication method with the electronic device. Accordingly, the mobile terminal can receive a GUI program from the electronic device and intuitively control the electronic device using the GUI program.

Furthermore, in accordance with an embodiment of the present invention, unlike the case where a conventional electronic device is not normally used when a physical button, etc. is out of order, an electronic device can be intuitively controlled at a remote place irrespective of an interface because a mobile terminal automatically performs communication with the electronic device by recognizing a marker attached to the electronic device.

Although some embodiments of the present invention have been described with reference to the accompanying drawings, it is not intended to limit the scope of the present invention, and a person having ordinary skill in the art may modify the present invention in various forms within the spirit and scope of the present invention determined by the claims.

What is claimed is:

1. An apparatus for controlling an electronic device, comprising:
    a camera configured to photograph a marker of the electronic device and provide a real image of the electronic device;
    a marker recognition unit configured to analyze the marker and provide marker analysis Information based on the analyzed marker for communication with the electronic device; and
    a control unit configured to perform communication with the electronic device based on the marker analysis information and provide an Augmented Reality (AR) manipulation Graphic User interface (GUI) for manipulating the electronic device using a GUI program received from the electronic device,
    wherein the marker recognition unit generates marker pose information by calculating a pose of the marker comprising a position and angle,
    wherein the control unit provides the AR manipulation GUI in which an AR graphic is displayed on the real image according to the position and angle of the electronic device based on the GUI program and the marker pose information.

2. The apparatus of claim 1, further comprising a control image output unit configured to provide a user with an AR manipulation screen generated by the AR manipulation GUI.

3. The apparatus of claim 2, further comprising an input and output unit configured to display the AR manipulation screen and transfer a control signal generated when the AR manipulation screen is touched.

4. The apparatus of claim 3, further comprising a control command reception unit configured to transfer the control signal, received from the input and output unit, to the control unit.

5. A method of controlling an electronic device, comprising:
- photographing a marker and a real image of the electronic device;
- analyzing the marker and providing marker analysis information based on the analyzed marker;
- generating marker pose information by calculating a pose of the marker comprising a position and angle;
- starting communication with the electronic device based on marker analysis information obtained by analyzing the marker;
- receiving a Graphic User Interface (GUI) program from the electronic device; and
- providing an Augmented Reality (AR) manipulation GUI for manipulating the electronic device using the GUI program, wherein an AR graphic is displayed on the real image according to the position and angle of the electronic device based on the GUI program and the marker pose information.

6. The method of claim 5, further comprising providing a user with an AR manipulation screen generated by the AR manipulation GUI.

7. The method of claim 6, further comprising displaying the AR manipulation screen and transferring a control signal generated when the AR manipulation screen is touched.

* * * * *